(12) United States Patent
Deglise et al.

(10) Patent No.: US 8,873,930 B2
(45) Date of Patent: Oct. 28, 2014

(54) NON-LINEAR CONTEXTUAL VIDEO PLAYBACK CONTROL

(71) Applicants: Wesley Claude Valery Deglise, Metz (FR); Barbara Lee, Arlington, VA (US)

(72) Inventors: Wesley Claude Valery Deglise, Metz (FR); Barbara Lee, Arlington, VA (US)

(73) Assignee: Kilo, Inc., Arlington, VA (US)

( * ) Notice: Subject to any disclaimer, the term of this patent is extended or adjusted under 35 U.S.C. 154(b) by 0 days.

(21) Appl. No.: 13/844,235

(22) Filed: Mar. 15, 2013

(65) Prior Publication Data

US 2014/0029914 A1 Jan. 30, 2014

Related U.S. Application Data

(60) Provisional application No. 61/674,858, filed on Jul. 24, 2012.

(51) Int. Cl.
*H04N 21/472* (2011.01)
*H04N 5/91* (2006.01)

(52) U.S. Cl.
CPC .................................. *H04N 5/91* (2013.01)
USPC .......................................................... 386/241

(58) Field of Classification Search
USPC .................................. 386/241; 715/719, 723
See application file for complete search history.

(56) References Cited

U.S. PATENT DOCUMENTS

| | | | | |
|---|---|---|---|---|
| 8,300,702 | B2* | 10/2012 | Yamazaki | 375/240.25 |
| 2003/0128765 | A1* | 7/2003 | Yoshigahara | 375/240.25 |
| 2009/0327894 | A1* | 12/2009 | Rakib et al. | 715/719 |
| 2010/0103463 | A1* | 4/2010 | Joshi et al. | 358/1.16 |
| 2010/0182264 | A1* | 7/2010 | Hahn et al. | 345/173 |
| 2012/0032877 | A1* | 2/2012 | Watkins et al. | 345/156 |
| 2013/0047081 | A1* | 2/2013 | Long et al. | 715/705 |
| 2013/0145394 | A1* | 6/2013 | Bakke | 725/38 |

* cited by examiner

*Primary Examiner* — Hung Dang
*Assistant Examiner* — Sunghyoun Park
(74) *Attorney, Agent, or Firm* — Richards Patent Law P.C.

(57) ABSTRACT

A system for associating a non-linear video path with a video file includes: a controller adapted to: present a video file through the user interface; receive a command through the user interface to associate a first path point with a frame in the video file; receive a command through the user interface to associate a second path point with a second frame in the video file; receive a command through the user interface to associate a third path point with a third frame in the video file, wherein the first path point, second path point, and third path point define a non-linear path, wherein the non-linear path is associated with the video file such that, when presented to a user for playback through a device that receives user input, progress of the video file during playback is controlled by one or more user inputs related to the non-linear path.

10 Claims, 8 Drawing Sheets

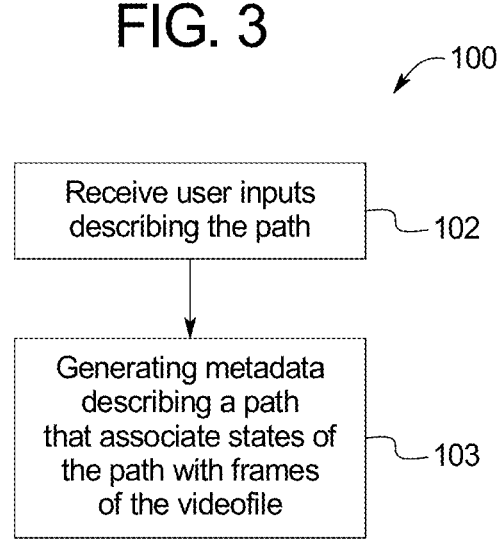

NON-LINEAR CONTEXTUAL VIDEO PLAYBACK CONTROL

CROSS-REFERENCE TO RELATED APPLICATIONS

This application incorporates by reference and claims priority to U.S. Provisional Application No. 61/674,858 filed Jul. 24, 2012.

BACKGROUND OF THE INVENTION

The present subject matter relates generally to video controls for video playback. More specifically, the present invention relates to a non-linear video control and a contextually relevant video control.

Video player software often provides user interface elements to control the playback of a video. The most common user interface elements have included a play button, pause button, rewind button, and often a "progress bar." A progress bar has been a linear bar located below the video content on a screen that represents the length of the video. A progress bar often has been a cursor showing the current position of playback that may be used to recall the location of desired content.

Generally, videos have been created and video player user interfaces have been designed so that videos may be played linearly from beginning to end with only occasional fast-forwarding, rewinding, or playback position changes. These existing video control mechanisms often retain playback metaphors developed when a limited number of buttons were available or a computer mouse controlled the interaction. For example, many video control mechanisms use play, pause, and rewind buttons that have existed since videotapes. Further, when used, prior progress bars have been generic and only vary from video to video in the speed of the cursor movement during playback. Despite the evolution of video media and video player devices, video control mechanisms have not changed much over time.

Users, such as viewers and content creators, have been increasingly seeking new ways of engaging with video content. In some instances, users have wanted content that is more interactive and engages the viewers as part of the action. Further, users often desired to view content in non-linear ways: fast-forwarding to contextually important parts of interest, replaying key sequences, watching segments in reverse. Prior solutions provided very limited ways to interact with content in non-linear ways and made it difficult to find desired segments of video content, leaving the burden on the user to recall the location of desired content or to manually seek and find it. Further, while new gesture-based controls have opened new opportunities for user interaction, typical video controls have not incorporated gesture-based controls.

What users have needed are video player controls that provide users more interactive and engaging content experiences. Further, what users have needed are video player controls that provide users new ways to interact with content non-linearly and new ways to see the playback position of the videos in context. Even further, what users have needed are video player controls that show users the context of the current playback location in the video. Finally, what users have needed are video player controls that provide users with gesture-based metaphors that exceed the limitations of traditional video player controls.

Accordingly, there is a need for non-linear video controls and contextual video controls as described herein.

BRIEF SUMMARY OF THE INVENTION

To meet the needs described above and others, the present disclosure provides video player controls that solve the problem of non-interactive, linear, context-less, gesture-less controls. These video player controls are referred to herein as paths. Further disclosed are systems and methods for creating video files utilizing paths. Even further disclosed are systems and methods for streaming video files including paths over a network.

As used herein, a path is a mechanism to control playback of a video that may be pre-defined by the creator of a video and may be stored in the video's metadata. The term "path," collectively describes all of the visual and non-visual elements that cooperate to provide the functional control of the video playback. In one example, a video of a child swinging on a swing may include a path that enables the user to control the playback of the video on a touchscreen enabled mobile electronic device by touching the child and moving the video forward (or backwards) by apparently pulling the child on the swing forwards (or backwards) through the user's touch of the touchscreen. The various elements of the path that enable this functionality are described in further detail below.

A path typically provides a continuous line or curve, defined by at least two endpoints, through which video playback is controlled. However, the path may be embodied in any shape, including three-dimensional shapes, as described further herein. A path may be a non-linear path that includes a non-linear series of (typically) continuous points associated with frames of a video. A path may also be a contextual path that includes a series of (typically) continuous points associated with locations on particular frames of videos. A path may be a non-linear path, a contextual path, or both. The points of a contextual path or a non-linear path may lie on a plane, or in three-dimensions.

A path may further include a visual path representation. A visual path representation is a graphical representation of the path that may be visible to the user during or associated with the video playback. A visual path representation demonstrates to the user how to gesture along the path to control the playback of the video. For example, the user may make a gesture tracing the visual path representation on a touchscreen directly on the video image. Alternatively, the user may make a gesture mimicking a path outside of the video frame, as indicated by the visual path representation. Even further, a user may make a three-dimensional gesture detected by a motion-sensing input device. In some instances, the visual path representation may be superimposed onto the video itself and, in other instances, the visual path representation may be associated with the video such that the visual path representation and the video occupy distinct spatial frames. The visual path representation may include line segments, curves, images, etc. The visual path representation may be a graphical animation that advances or reverses in conjunction with the videos.

A visual path representation of the path may be superimposed on the image sequence during playback. Alternatively, a visual path representation may be invisible during playback, for example, in response to a lack of user input. Further, a visual path representation may change visibility during playback, for example, an invisible visual path representation may become visible during playback in response to a user input.

Video playback may be controlled by gestures that substantially follow the path. A gesture along the trajectory of the path moves the video forward in sequence, and a gesture reversed relative to the trajectory of the path runs the video sequence in reverse. A gesture may be a touch gesture performed on a touchscreen, or, alternatively, may be a three-dimensional gesture input tracing a three-dimensional path detected by a motion-sensing input device.

In an embodiment, a video having a path may be generated by a method executed by a processor. First, the processor receives user inputs describing the path for a video. Then, the processor generates metadata describing the path that associates states of the path with frames of the video. The path related metadata may then be associated with the video such that future playback of the video may be controlled through interaction with the path.

In an embodiment of the various solutions provided by this disclosure, a video including a path may be streamed from a server to a device across a network. Because the path is meant to be interactive, existing solutions of loading frames of the video linearly from start-to-finish may not be optimal. Rather, it may be more useful to initially stream non-adjacent frames that are representative of the whole span of action represented by the path, and then for additional streamed frames to fill in the gaps between the initially streamed frames. This allows a user to immediately control playback along the full length of the path before the video is fully loaded and before all of the frames are available. While streaming during playback, any missing frames are skipped until loaded. As a result, if a video is of a child swinging from one of the screen to the other, the first frames to load may be the first and last frames, followed by a middle frame, and then the remaining frames may be loaded in an order intended to evenly fill in the missing frames. Under this method, a user is able to advance or reverse the video from start to finish as soon as the first two frames have been delivered to the device. Then, as the remaining frames are delivered, the video playback becomes more complete, more complex, and smoother.

A method of streaming from a server to a device may be as follows. First the server forms an empty queue. The queue is a first-in first-out list of frames where the first frame inserted into the queue is the first frame to be streamed to the client and may insert the first and last frames of the video. Next, the first and last frame of the video may optionally be enqueued to fill the ends of the path. The unqueued frames form a current frameset. As used from here on, current frameset shall mean any subset of the initial frameset being acted on by the recursive steps that follow. In the first recursive step, the server checks to see if the current frameset has a length of 1 or 2 frames. If yes, the server enqueues the frame or frames. Alternatively, if the current frameset has a length greater than 1 or 2 frames, the server determines a middle frame of the current frameset. A middle frame is any frame of the frameset other than the first frame (i.e., the chronologically earliest frame of the frameset) that is chosen in any manner to substantially cause the method to fill in frames along the path roughly equally across its length. Next, the middle frame is enqueued. Then, the frameset is split into two daughter framesets, the first frameset including frames chronologically before the middle frame, and the second frameset including frames chronologically after the middle frameset. After that, one of the first frameset and the second frameset is passed back to the first recursive step as the current frameset, after which the second frameset is passed to the first recursive step as the current frameset. Finally, the method leaves the recursive steps to begin streaming, whereupon the video is streamed to the client by first streaming the path, then streaming the frames in the order described in the queue.

In one example, a system for associating a non-linear video path with a video file includes: a user interface in communication with a controller; and a video file storage mechanism in communication with the controller; wherein the controller is adapted to: present a video file through the user interface; receive a command through the user interface to associate a first path point with a frame in the video file; receive a command through the user interface to associate a second path point with a second frame in the video file; receive a command through the user interface to associate a third path point with a third frame in the video file, wherein the first path point, second path point, and third path point define a non-linear path, wherein the non-linear path is associated with the video file such that, when presented to a user for playback through a device that receives user input, progress of the video file during playback is controlled by one or more user inputs related to the non-linear path. The path points may be located within the video file frame or not. The path points may be associated with frames or may be associated with specific positions within frames.

In another example, a system for associating a non-linear video path with a video file includes: a user interface in communication with a controller; and a video file storage mechanism in communication with the controller; wherein the controller is adapted to: present a video file through the user interface; receive a command through the user interface to associate a first path point with a position in a frame in the video file; receive a command through the user interface to associate a second path point with a position in a second frame in the video file, wherein the first path point, and second path point define a path, wherein the path is associated with the video file such that, when presented to a user for playback through a device that receives user input, progress of the video file during playback is controlled by one or more user inputs related to the path points. The command to associate may be provided by a user interaction through the user interface, derived from a function provided through the user interface, or otherwise received. The commands may be touch commands and/or gestures with three degrees of freedom.

In a further example, a system for streaming a video file comprising: a video storage mechanism; and a controller in communication with the video storage mechanism, wherein the controller is adapted to: receive a video file defining a first segment, the first segment including at least five frames; identify a first middle frame between a first frame and a last frame of the first segment; divide the first segment into a second segment and a third segment; identify a second middle frame in the second segment and a third middle frame in the third segment; repeat the steps of dividing and identifying until all frames in the first segment have been identified; and output the frames from the first segment in the order in which they have been identified. Outputting the frames may include streaming the video file frames in order of their identification. Alternatively, outputting the frames may include storing the video file frames in order of their identification. Storing the video file frames in order of their identification may include storing the video file frames in order of their identification in a new video file.

An object of the invention is to provide a solution to the lack of ways to provide interactive and immersive content.

Another object of the invention is to provide a solution to the limitations inherent in prior linear video player controls.

A further object of the invention is to provide a user an understanding of the current playback position in the context of the video action.

Another advantage of the invention is that it provides interactive and immersive content experiences.

Yet another advantage of the invention is that it provides mechanisms to interact with content non-linearly.

A further advantage of the invention is that show users the context of the current playback location.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is a flowchart of an example of a method for generating a path of the invention.

DETAILED DESCRIPTION OF THE INVENTION

Figure 1A:
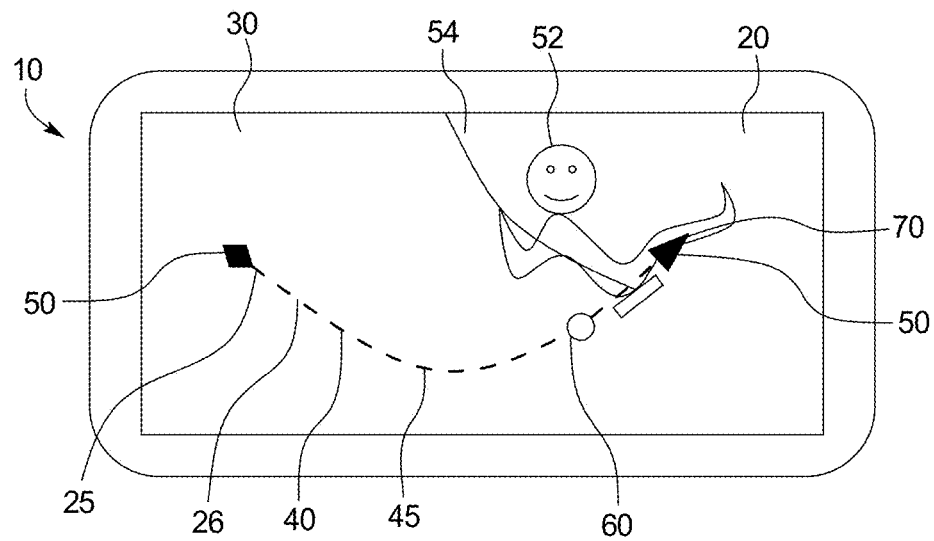
FIG. 1a is a front view of a device displaying a movie having an example of a path of the invention.

FIGS. 1a through 1d illustrate a device 10 during playback of example videos 30 each including a path 40 represented by a visual path representation 45. The path 40 is a mechanism to control playback of the video 30, as described further herein. Although the examples provided describe the path 40 used to control video playback, it is understood that the path 40 may be used to control other media playback, such as, slideshows, etc., as will be understood by one of skill in the art.

As shown in FIG. 1a, the path 40 may be a non-linear path 25 that includes a non-linear series of typically continuous points associated with frames of the video 30. The path 40 may further be a contextual path 26 that includes a series of typically continuous points associated with locations on particular frames of the video 30. As shown in FIG. 1a, a path 40 may be both a non-linear path 25 and a contextual path 26. Though a path 40 may be merely one or the other. The points of a contextual path 26 or a non-linear path 25 may lie on a plane, or in three-dimensions. In the example shown in FIG. 1a, the non-linear path 25 and the contextual path 26 are two-dimensional. As further shown in FIG. 1a, the path 40 may further include a visual path representation 45. The visual path representation 45 is a graphical representation of the path 40 that may be visible to a user 80 (FIGS. 2a and 2b) during playback.

Figure 2A:
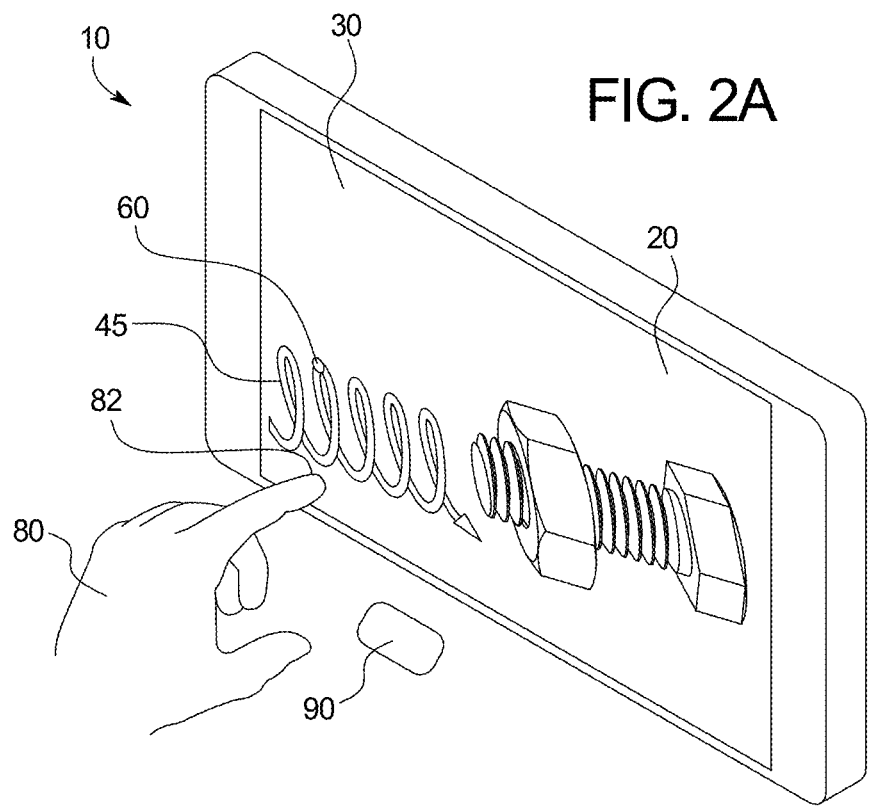
FIG. 2a is a perspective view of a user performing a three-dimensional gesture along a path of the invention.
Figure 2B:
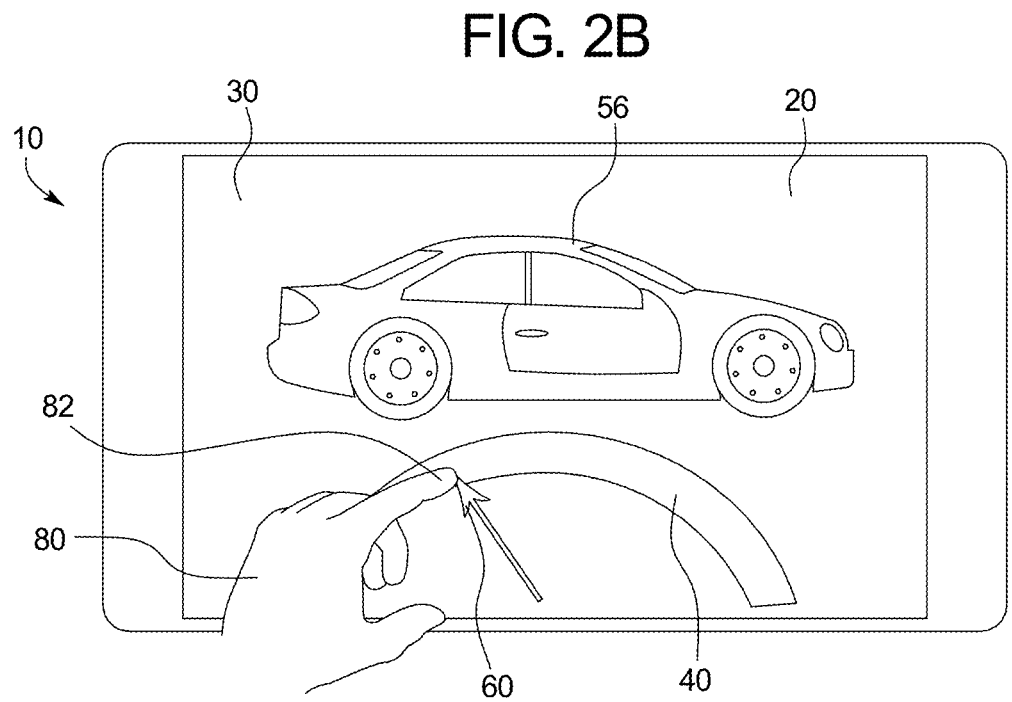
FIG. 2b is a front view of a user performing a gesture along a path of the invention.

FIGS. 2a and 2b illustrate a user 80 using a gesture 82 to control playback of the video. One of the functions of the visual path representation 45 is to demonstrate to the user 80 how to make a gesture 82 to control the playback of the video. In order to control the playback of the video, the gesture 82 must mimic the shape of the path 40. For example, as shown in FIG. 2a the user 80 may make a three-dimensional gesture 82 mimicking the three-dimensional shape of the visual path representation 45, which is related to the shape of the path 40. The three-dimensional gesture 82 may be detected by a motion-sensing input device 90 and related to the path 40 by the device 10 to control playback. In a second example, as shown in FIG. 2b, the user 80 may make a touchscreen gesture 82 mimicking the path 40 by tracing the visual path representation 45.

Figure 1B:
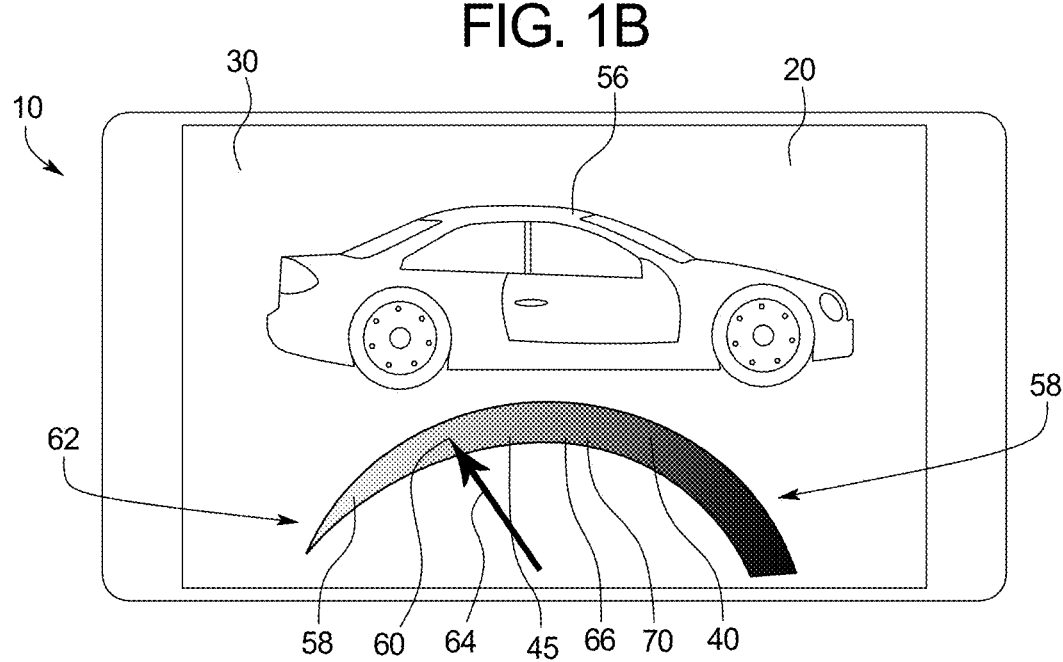
FIG. 1b is a front view of a device displaying a movie having a further example of a path of the invention.
Figure 1C:
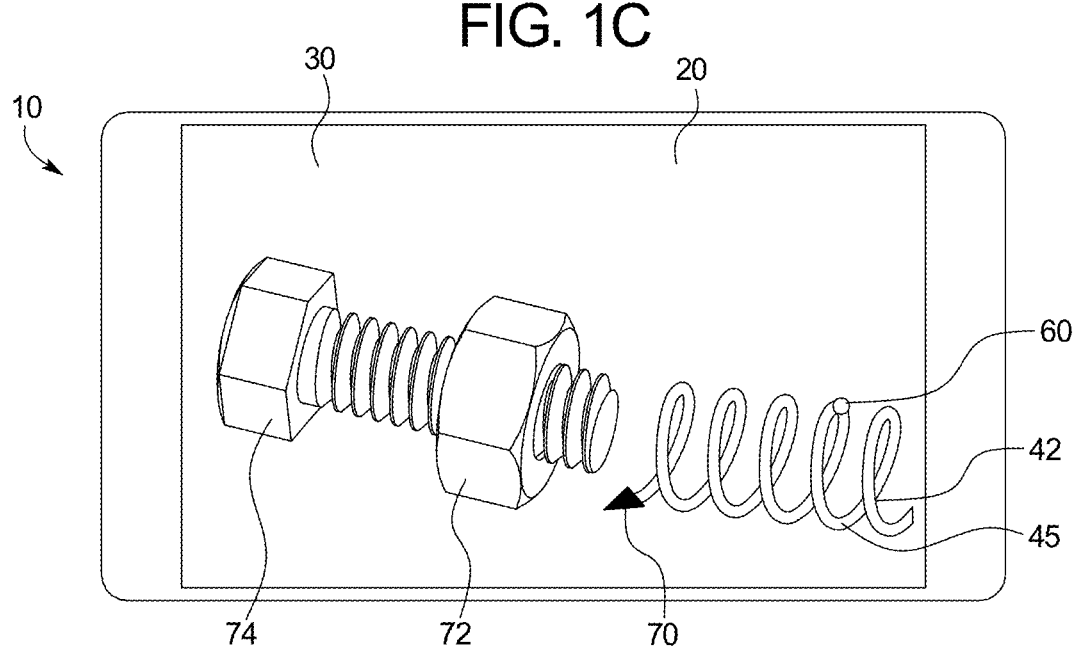
FIG. 1c is a front view of a device displaying a movie having yet a further example of a path of the invention.

As will be understood by the various examples provided herein, the path 40 is defined by at least two endpoints 50, and may take any shape. The path 40 may include line segments (FIGS. 1a and 1d), curves (FIGS. 1a through 1d), images (FIGS. 1b and 1c), etc. Additionally, the path 40 may be three-dimensional (FIG. 1c). Further, the path 40 may be a graphical animation 58 that advances or reverses in conjunction with the video 30 (FIG. 1b). The visual path representation 45 may have a progress indicator 60. The progress indicator 60 moves along the visual path representation 45 during playback to indicate the progress of the video 30. The video 30 may play in response to a user pressing a play button or in response to user making a gesture 82 along the path 40. The path 40 may also have a trajectory 70 showing the intended direction of playback.

The visual path representation 45 may be superimposed on the video 30 during playback. Alternatively, the visual path representation 45 may also be hidden during playback, for example, in response to a lack of user input. Further, the visual path representation 45 may also change visibility during playback; for example, a hidden visual path representation 45 may become visible during playback in response to a user input.

Figure 1D:
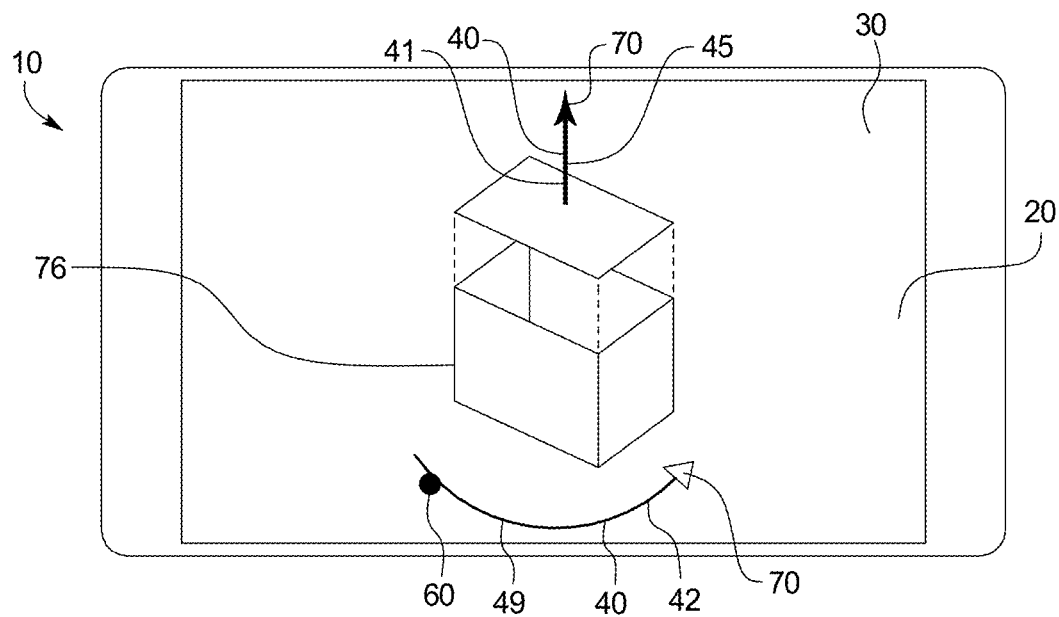
FIG. 1d is a front view of a device displaying a movie having an additional example of a path of the invention.

The paths 40 may be pre-defined by the video creator. The path 40 may be defined by the method 400 (FIG. 4) described herein or by alternative methods. The path 40 may be stored in the metadata of video 30, in a separate file, a database, or any other data storage location associated with the video. As shown in FIG. 1d, the video 30 may have multiple paths 40 corresponding to a single segment of the video 30. Alternatively, the video may have multiple paths 40 corresponding to different segments of the video 30.

As shown in FIG. 1a, the visual path representation 45 of the path 40 may be superimposed over the video 30 during playback. The video 30 depicts a child 52 on a swing 54. The path 40 is a non-linear path 25 and is a contextual path 26 that traces out the motion of the swing 54 in the video 30. The visual path representation 45 shows the context of the path 40. The trajectory 70 indicates the direction of the swing's motion during playback. The user 80 may gesture 82 along the progress indicator 60 of the visual path representation 45 to direct playback of the video 30. The user 80 may perceive the action of the child 52 on the swing 54 as being directed by the touchscreen gesture 82.

As shown in FIG. 1b, a path 40 may be used to emphasize the action of the video 30. The video 30 depicts the acceleration of a sports car 56 to high velocity. The path 40 is a non-linear path 25 tracing the arc of a speedometer 62, but is not a contextual path 26 in that the path 40 is not overlain directly on the sports car 56 whose movement is apparently controlled by the path 40.

As shown, the visual path representation 45 in FIG. 1b is a graphical animation 58 of a speedometer 62 having a needle 64. During playback, the needle 64 acts as a progress indicator 60 relating the increasing velocity of the sports car 56 to the duration of playback. The speedometer 62 has a gradient 66 that indicates the trajectory 70 of the progress indicator 60 during playback. The user 80 may make a touchscreen gesture 82 along the speedometer 62 of the visual path representation 45 to direct playback of the video 30.

As shown in FIG. 1c, the path 40 may correspond to a three-dimensional path 40. The video 30 depicts a nut 72 being screwed onto a screw 74. The visual path representation 45 is a two-dimensional rendering of the space traced out by a point on the nut 72 as it is screwed. The path 40 is shaded and rendered to give it a three-dimensional appearance to act as a cue for the associated three-dimensional gesture 82. The three-dimensional gesture 82 may be detected by a motion-sensing input device 90, as described further herein, to direct playback of the video 30. Alternatively, the user 80 may make a touchscreen gesture 82 tracing along the visual path representation 45 to direct playback. In a further example, a user may make a touchscreen gesture 82 represented by the visual path representation 45 directly on the nut 72 to direct playback.

As shown in FIG. 1d, the video 30 may include multiple paths 40. The video 30 depicts a box 76 that can be rotated and opened. A first path 41 traces out the opening of the box 76. A second path 42 depicts the rotation of the box 76. The user 80 may make a gesture 82 along either the first path 41 or the second path 42 to control playback along either video sequence.

FIG. 2a illustrates a user 80 using a three-dimensional gesture 82 to control playback of a video 30 having a path 40 being displayed on a device 10. A motion-sensing input device 90 detects a three-dimensional gesture 82 and the device 10 relates the three-dimensional gesture 82 to the path 40. To make the three-dimensional gesture 82, the user 80 mimics the visual path representation 45 by making a gesture 82 in a position in which the motion-sensing input device 90 may capture the motion of the gesture 82. By making the three-dimensional gesture 82 along the direction of the visual path representation 45 indicated by the trajectory 70, the playback advances forward. Conversely, by making the three-dimensional gesture 82 along the opposite direction of the visual path representation 45, the playback of the video sequence runs in reverse.

FIG. 2b illustrates a user 80 using a touchscreen gesture 82 to control playback of a video 30 having a path 40 being displayed on a device 10. A touchscreen 20 detects the touchscreen gesture 82. To make the touchscreen gesture 82, the user's hand substantially traces out the path 41 along the touchscreen 20. The user 80 will perceive the action of the sports car 56 as being directed by the touchscreen gesture 82.

FIG. 3 shows an embodiment of the method 100, performed by a processor, of generating a path 40 for a video 30. First, at step 102, the processor receives user inputs describing the path 40 for a video 30. Then, at step 103, the processor generates metadata describing the path 40 that associates states of the path with frames of the video.

Figure 4A:
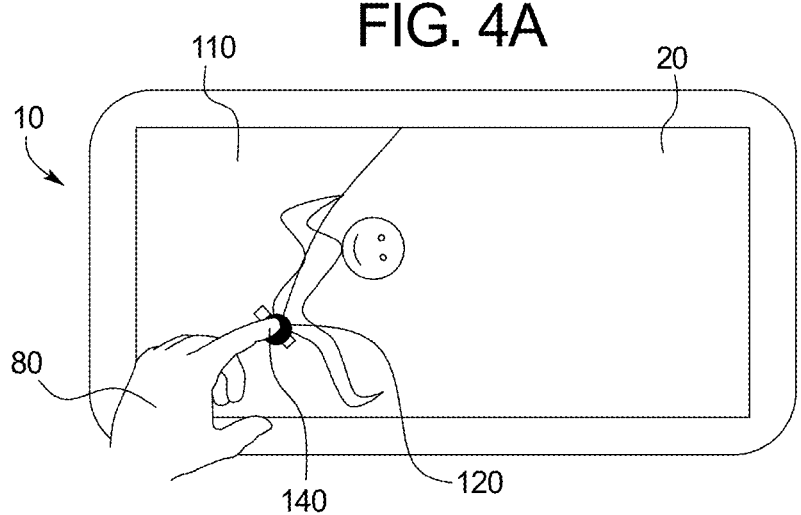
FIG. 4a is a front view of a user interacting with a user device to input information in accordance with the method of FIG. 3.
Figure 4B:
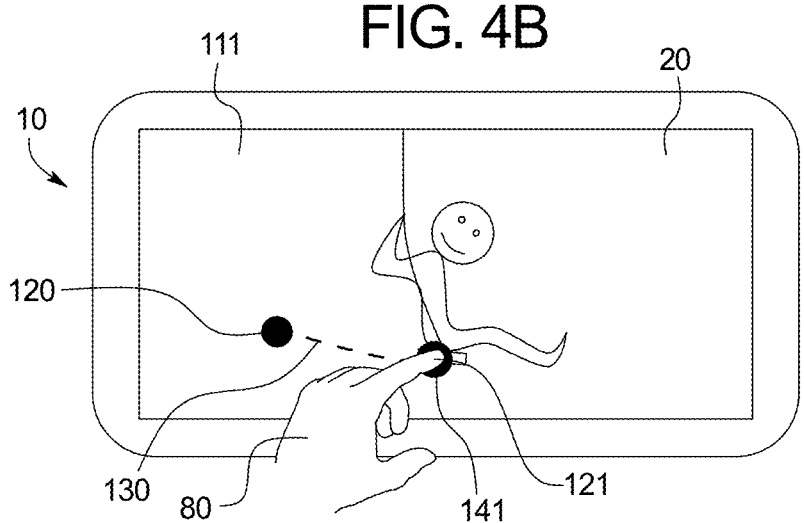
FIG. 4b is a front view of a user interacting with a user device to input information in accordance with the method of FIG. 3.
Figure 4C:
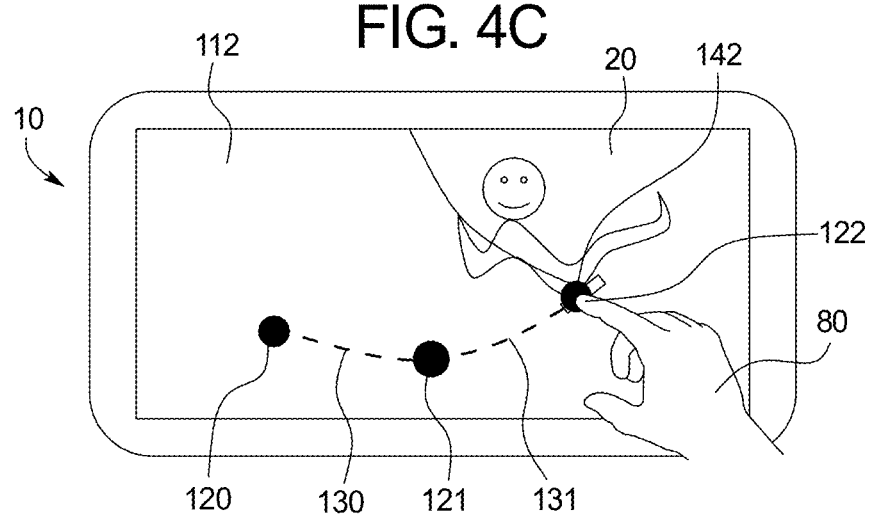
FIG. 4c is a front view of a user interacting with a user device to input information in accordance with the method of FIG. 3.

At step 102, in a simple example shown in FIGS. 4a through 4c, the user 80 may input points 140-142 describing a path 40. In FIG. 4a, the user 80 inputs a point 140 corresponding to the frame 110 of a video 30 into a device 10 having a touchscreen 20. As shown in FIG. 5b, the user 80 then advances to frame 111 and inputs a point 101 corresponding to frame 111. The display 20 may show an indicator 120 of the previous point 100 and an interpolated path 130 to show the path 40 as it is built. Then, as shown in FIG. 4c, the user 80 advances to frame 112 and inputs a point 142. Again, the display 20 may show indicators 120-122 and an interpolated path 130 to show the path as it is built. Once all the points 140-142 are entered, the method may proceed to step 103. Alternatively, or in addition to inputting points 100-102, the user 80 may input images, vector paths, functions, curves, and animations describing the visual path representation 45 of a path 40.

At step 103, the processor generates metadata describing the path 40 that associates states of the path 40 with frames 110-112 of the video 30. Metadata includes any description of the path 40 that is adapted to permit the use of the path 40 during the playback of the video. The metadata may include images, vector paths, functions, curves, and animations, and any other digital media capable of comprising the path 40 as will be apparent to those skilled in the art based on the disclosures provided herein. The generated metadata may then be included in the video file, or alternatively stored in a separate file or database associated with the video 30.

In the metadata, the path 40 may be described as a curve. For example, the path 40 may be described by Bezier curves, quadratic curves, etc., or by multiple connected curves. Further, the path 40 may be described as a series of points. Each point in the path 40 may include an 'x' attribute to define the point position on X (horizontal axis), a 'y' attribute to define the point position on Y (vertical axis), a 'z' attribute to define the point position on Z (depth axis), and/or a 'pos' attribute to define the frame associated with the point in the path 40. For example, the description of the path may include a curve description:

```
curve :[
    {x: 420, y: 20},
    {x: 235, y: 450, pos: 0.25},
    {x: 20, y: 20}
];
```

The curve description may also include other attributes, for example, the curve description may include "popup" information, such as, text associated with a position or a frame that may be displayed during playback.

The metadata may also have path-wide attributes. For example, the metadata describing the path 40 may include path-wide attributes such as:

```
config:{
    startPos: 0.5,
    orientation: landscape
}
```

In this example, 'startPos' defines the start of playback (start-Pos:0.5' indicates that the start of playback will be positioned in the middle of the path 40 and display the corresponding frame upon initially displaying the video 30).

Figure 5:
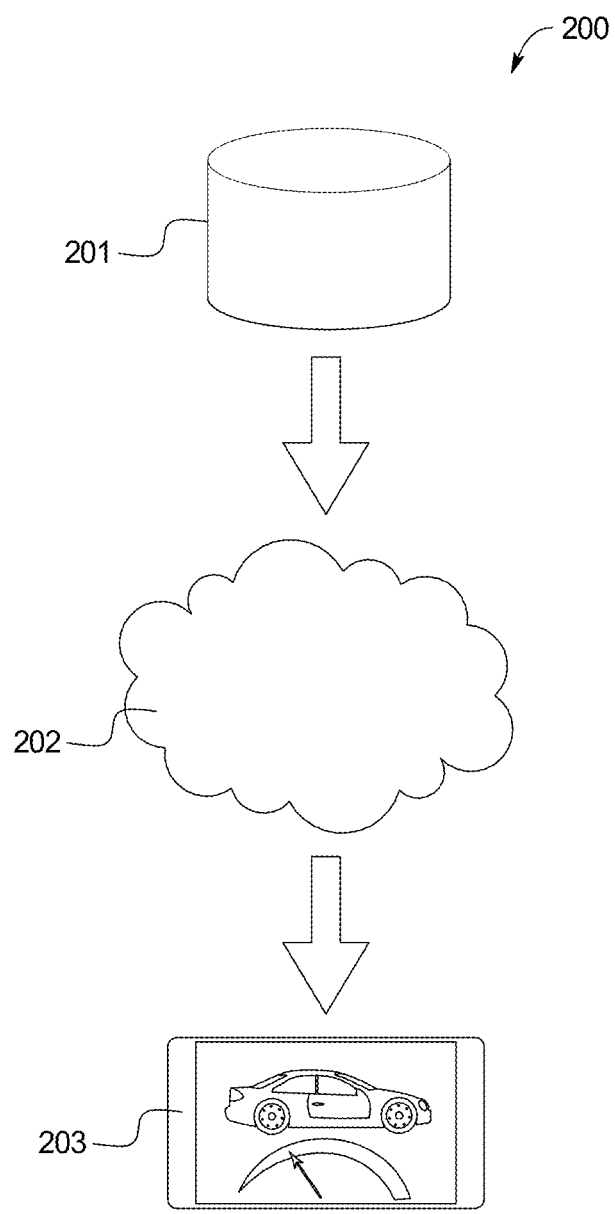
FIG. 5 is a schematic diagram of the system for streaming videos having a path.

FIG. 5 illustrates a streaming system 200 for streaming a video 30 having a path 40 from a streaming server 201 to a device 203 across a network 202. Because the path 40 is meant to be interactive, loading frames of the video 30 from start-to-finish may not be optimal. Rather, it may be more useful to load representative frames along the length of the whole path 40 in a non-consecutive order. For that reason, the streaming system 200 may be adapted to stream non-consecutive frames from along the entire length of the path 40 so as to fill the frames in roughly equally along the length of the video 30. This allows a user 80 to immediately start playback along the full length of the path 40 before the video 30 is fully loaded. During playback, any missing frames are skipped until loaded. The streaming system 200 may stream the video 30 using the method 250 (FIG. 6) to reorder and stream the frames.

Figure 6:
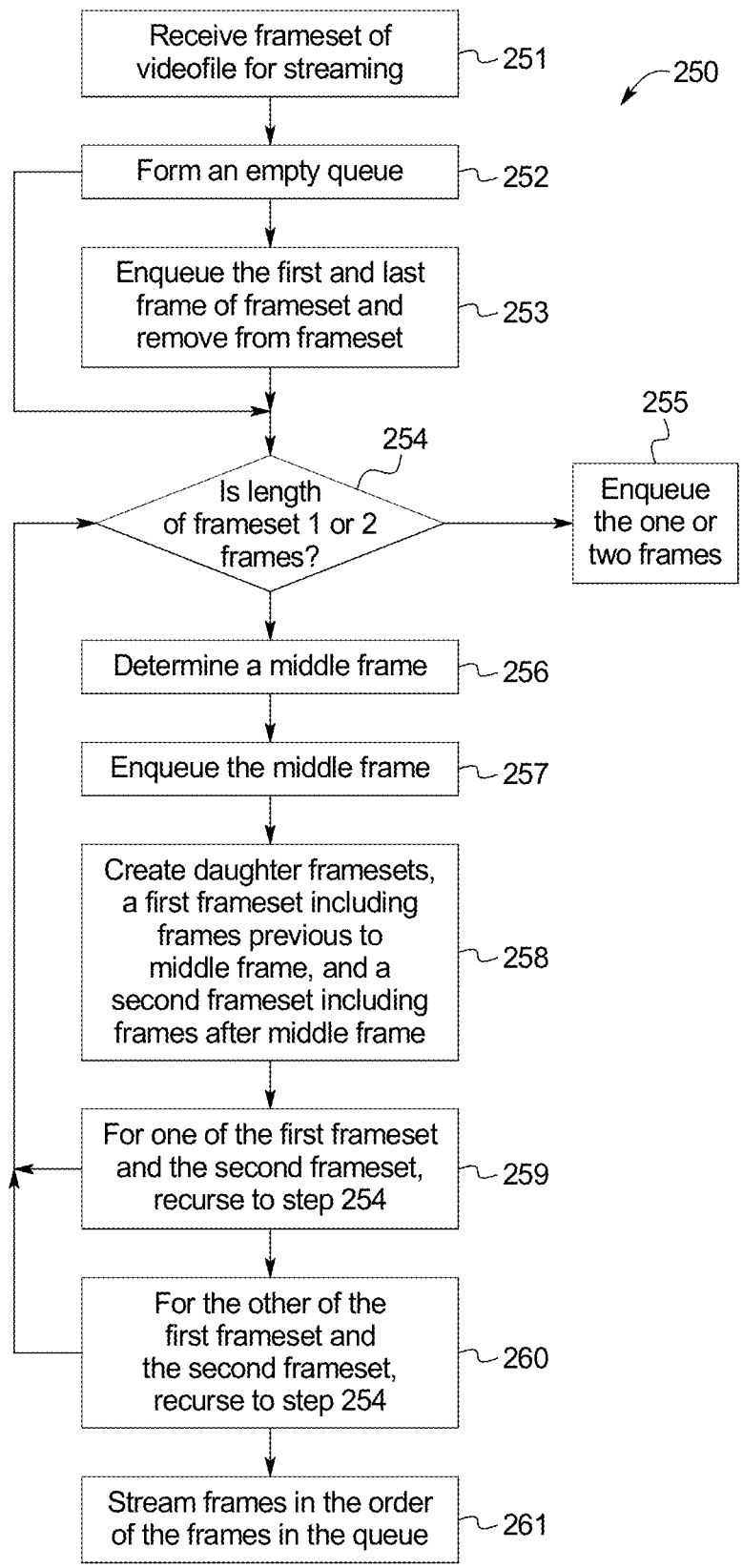
FIG. 6 is a method for streaming videos having a path.

FIG. 6 illustrates a method 250 performed by a server 201 of streaming a video 30 having a path 40 to a client. First, at step 251, the server 201 receives a video 30 for streaming to a device 203 having an initial frameset. Second, at step 251, the server 201 forms an empty queue. A queue is a first-in first-out list of frames where the first frame inserted into the queue is the first frame to be streamed to the device 203 and may insert the first and last frames of the video file 30. At step 253, the first and last frame of the video 30 may optionally be enqueued to fill the ends of the path 40. The unqueued frames form a current frameset. As used from here on, current frameset shall mean any subset of the initial frameset being acted on by the recursive steps 254-260. Third, at step 254, the server 201 checks to see if the current frameset has a length of 1 or 2 frames. If yes, the method 250 proceeds to step 255; if no, the method proceeds to step 256. If the method 250 proceeds to step 255, the server 201 enqueues the frame or frames of the current frameset. Alternatively, if the method 250 proceeds to step 256, the server determines a middle frame of the current frameset. A middle frame is any frame of the frameset other than the first frame (i.e., the chronologically earliest frame of the frameset) that is chosen to substantially cause the method 250 to fill in frames along the path 40 roughly equally. Then, at step 257, the middle frame is enqueued. Next, at step 258, the frameset is split into two daughter framesets, the first frameset including frames chronologically before the middle frame, and the second frameset including frames chronologically after the middle frame. After enqueueing the middle frame, at step 259, one of the first frameset and the second frameset is passed to step 254 as the current frameset. Then, at step 260, the other of the first frameset and the second frameset is passed to step 254 as the current frameset. Finally, at step 261, the video file 30 is streamed to the client by first streaming the path 40, then streaming the frames in the order described in the queue. It is contemplated that in alternative embodiments, the streaming system 200 may receive a video 30 including a description of the frames previously reordered in the manner of the method 250 for streaming. In other words, the video 30 may be stored as a file in the reordered condition prior to streaming. In such instances, the frames could be streamed in sequential order to accomplish the advantages of the systems and methods described herein. Accordingly, as shown, the reordering of the frames may occur prior to or during the streaming process.

Figure 7:
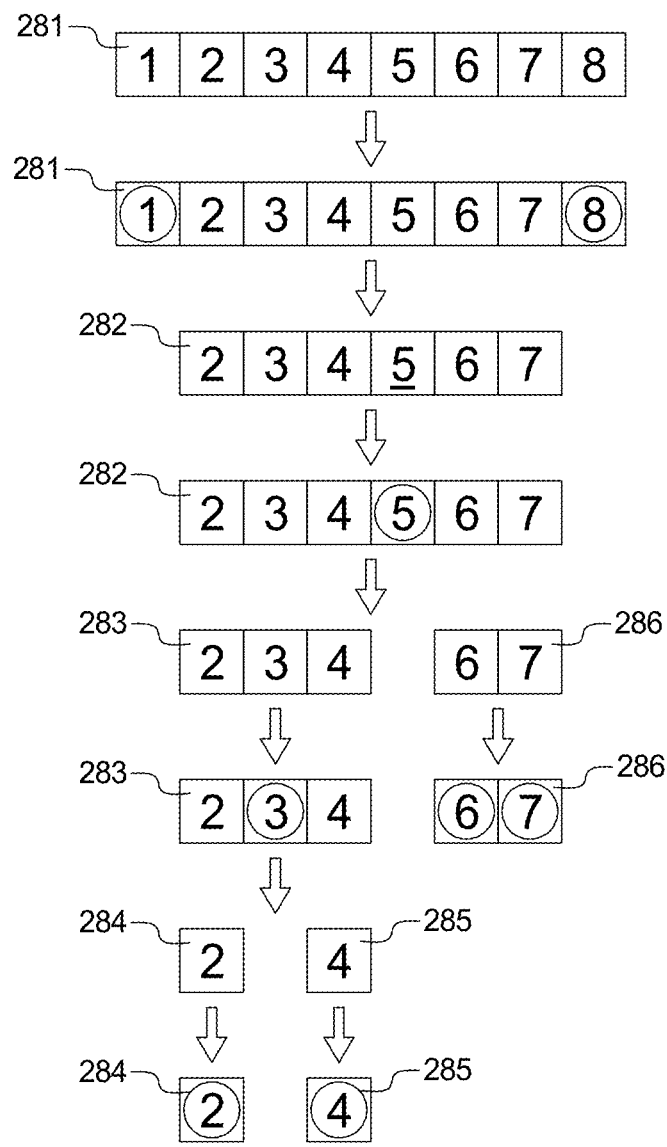
FIG. 7 is a diagram illustrating an example frameset during reordering for the method of streaming for FIG. 6.
Figure 8:
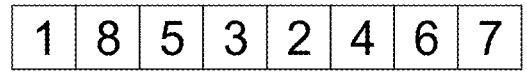
FIG. 8 is a diagram illustrating an example frameset reordered for streaming using the method of FIG. 6.

FIG. 7 illustrates an example 280 of the method 250 as applied to an eight-frame frameset 281. Frameset 281 is the initial frameset at the start of the method 250. First, at step 253, the server 201 enqueues the first frame 281*a* and the last frame 281*h* (enqueuing is represented by circled frames). Then, frameset 282 has proceeded to step 256, where a middle frame 282*d* is chosen. Next, the server 201 enqueus the middle frame 282*d*. After that, the server 201 forms daughter framesets 283 and 286. Then, following step 259, the server recurses to process frameset 283. A middle frame 283*b* is chosen and enqueued. Once again, the server forms daughter framesets 284 and 285. Framesets 284 and 285 both have a length of only one frame, thus, per steps 254 and 255, framesets 284 and 285 are enqueued. Having finished the recursion of frameset 283, the server 201 returns to frameset 286 to be recursed. Since frameset 286 has a length of two frames, as per steps 254 and 255, both frames of frameset 286 are enqueued. The resulting queue is shown in FIG. 8.

Aspects of the systems and methods described herein are controlled by one or more controllers. The one or more controllers may be adapted run a variety of application programs, access and store data, including accessing and storing data in associated databases, and enable one or more interactions via the device 10. Typically, the one or more controllers are implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memories and an interconnect bus. The CPU may contain a single microprocessor, or it may contain a plurality of microprocessors for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output displays (e.g., monitors, printers, touchscreen 20, motion-sensing input device 90, etc.) and one or more input mechanisms (e.g., keyboard, mouse, voice, touch, bioelectric devices, magnetic reader, RFID reader, barcode reader, touchscreen 20, motion-sensing input device 90, etc.) serving as one or more user interfaces for the controller. For example, the one or more controllers may include a graphics subsystem to drive the output display. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device 10, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A system for playback of a video file including a video path comprising:
    a controller;
    a user interface provided by the controller; and
    a non-transitory computer readable medium including instructions that when executed by the controller cause the controller to perform the steps of:
        providing a video playback application through the user interface;
        loading two or more frames of a first video into the video playback application;
        initiating playback of the first video through the user interface, wherein playback of the first video is controlled by user gestures received through the user interface along a first path defined by at least three non-linear positions defined through the user interface;
        loading two or more frames of a second video; and
        initiating playback of the second video through the user interface, wherein playback of the second video is controlled by user gestures received through the user interface along a second path defined by at least three non-linear positions on the user interface;
        wherein the first path and the second path are different shapes.

2. The system of claim 1, wherein the first path is defined as a first series of points defined through the user interface and the second path is defined as a second series of points defined through the user interface, wherein at least one point of the first series of points is not a member of the second series of points.

3. The system of claim 1, wherein a visual representation of the first path is displayed during playback of the first video and wherein the visual representation of the first path is superimposed on the first video during playback.

4. The system of claim 1, wherein the first path has a forward direction and a backward direction, and wherein a gesture along the first path in the forward direction advances playback forward in the video and a gesture along the first path in the backward direction advances playback of the video in reverse.

5. The system of claim 1, wherein a current playback location is determined by a current location of a user input on the first path.

6. The system of claim 1, wherein the step of beginning playback of the first video is initiated before all frames of the first video have been loaded, and wherein any unloaded frames of the first video are loaded concurrent with the playback of the first video.

7. The system of claim 6, wherein during playback of the first video, playback skips the unloaded frames of the first video and proceeds to a next loaded frame according to a direction of playback.

8. The system of claim 7, wherein the unloaded frames of the first video are loaded concurrent with the playback of the first video in an order other than the order defined by linear playback.

9. The system of claim 7, wherein the non-transitory computer readable medium includes further instructions that when executed by the controller cause the controller to perform the steps of:
    identify a first middle frame between a first frame and a last frame of a first segment of the first video;
    divide the first segment into a second segment and a third segment;
    identify a second middle frame in the second segment and a third middle frame in the third segment;
    repeat the steps of dividing and identifying until all frames in the first segment have been identified; and
    load the frames from the first segment in the order in which they have been identified.

10. The system of claim 1, wherein the system further includes a network interface, and wherein the two or more frames of a first video are loaded via the network interface.

* * * * *